June 12, 1956 R. O. ENDRES 2,750,509

PULSE GENERATORS

Filed Jan. 16, 1952

INVENTOR
Richard O. Endres
BY [signature]
ATTORNEY

United States Patent Office 2,750,509

Patented June 12, 1956

2,750,509

PULSE GENERATORS

Richard O. Endres, Moorestown, N. J., assignor to Radio Corporation of America, a corporation of Delaware Application January 16, 1952, Serial No. 266,650

17 Claims. (Cl. 250—36)

This invention relates generally to pulse generators, and particularly relates to monostable circuits which may be triggered to provide output pulses and to astable circuits or flip-flop pulse generators.

A bistable circuit may be defined as a circuit having two stable states of operation. Consequently, a bistable circuit may be triggered by the application of trigger pulses from one stable state of operation to the other. Thus, for example, an Eccles-Jordan or direct-coupled multivibrator, which is sometimes referred to as a flip-flop circuit, is a bistable circuit or pulse generator. A monostable circuit has one stable state of operation and may be triggered by a trigger pulse into another state of operation from which it returns automatically after a predetermined period of time to its stable state of operation. Such a circuit will develop an output pulse of predetermined width or duration in response to an applied trigger pulse. An astable pulse generator may be defined as a free-running oscillator having two states of operation; the circuit will automatically and periodically go from one state of operation to the other to develop output pulses of predetermined width.

The pulse generators of the present invention are based on a bistable transistor circuit disclosed and claimed in the patent to Everett Eberhard 2,533,001 of December 5, 1950. As shown in Figure 3 of the Eberhard patent a bistable transistor circuit may be provided by connecting an impedance element such as a resistor between the base and ground of a current multiplication transistor. Such a current multiplication transistor may be defined as a transistor providing short-circuit collector current increments which are larger than corresponding emitter current increments. By applying trigger pulses of opposite polarities, for example, to the emitter, this bistable transistor circuit may be triggered alternately from one state of stable current conduction to the other.

In accordance with the present invention, the bistable transistor circuit disclosed in the Eberhard patent referred to is modified to provide either a monostable or an astable pulse generator.

It is accordingly an object of the present invention to provide a novel monostable or astable pulse generator including a single transisor.

Another object of the invention is to provide a monostable pulse generator which is stable in operation, has a low power consumption and develops, in response to an applied trigger pulse, an output pulse having a width which can readily be predetermined.

A further object of the invention is to provide an astable or free-running oscillator or pulse generator which is stable in operation and requires a minimum of component parts.

A pulse generator in accordance with the present invention includes a current multiplication transistor having a base, an emitter and a collector electrode. The base is in low-resistance contact with the semi-conducting body of the transistor while the emitter and collector are in rectifier contact with the body and may, therefore, be called rectifier electrodes. Impedance elements such, for example, as resistors are connected between ground and each of the electrodes. In accordance with the present invention, a delay line is coupled between one of the rectifier electrodes and ground, that is, between either the emiter and ground or between the collector and ground. If the bias voltage between emiter and base is in the reverse direction, the resulting pulse generator will be monostable. On the other hand, if the effective bias voltage is applied between emitter and base in the forward direction, the pulse generator may be made to be astable or free-running.

It is feasible to couple an open-circuited delay line to either the emitter or the collector. Alternatively, a short-circuited delay line may be coupled to the emitter. When an open-circuited delay line is coupled to the collector and when a bias voltage in the forward direction is applied between emitter and base, the resulting generator will be astable.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
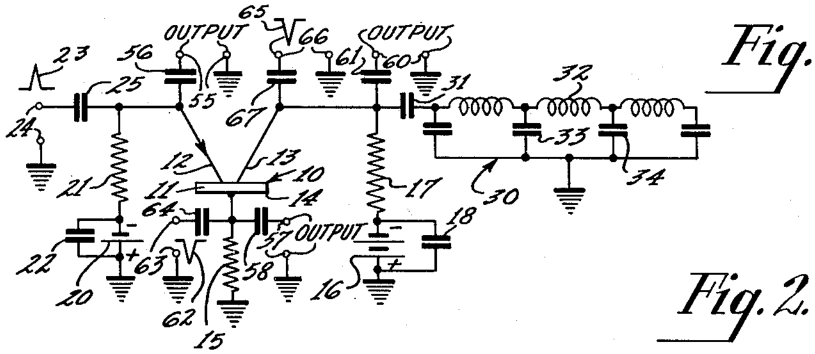
Figure 1 is a schematic circuit diagram of a pulse generator which may be either monstable or astable in accordance with the present invention

Referring now to the drawing wherein like elements are designated by the same reference characters throughout the figures and particularly to Figure 1, there is illustrated a pulse generator which may be either monostable or astable. The circuit of Figure 1 includes a transistor 10 comprising a semi-conducting body 11, an emitter electrode 12, a collector electrode 13 and a base electrode 14 in contact with the body 11. Base 14 is in low-resistance contact with body 11 while emitter 12 and collector 13 are in rectifier contact with the body. The transistor 10 should be a current-multiplication transistor where short-circuit collector current increments are larger than corresponding emitter current increments over a certain range of operating potentials. It is well known that most type A or rectifier contact transistors have current multiplication as well as other types of transistors.

Figure 3:
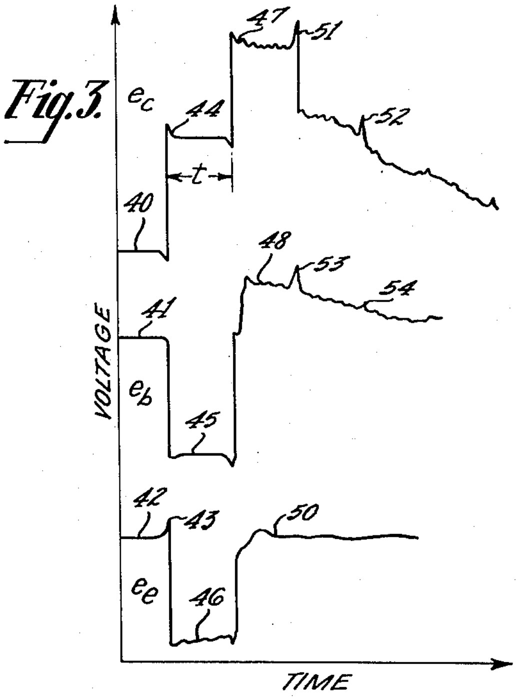
Figure 3 is a graph showing the voltages at the three electrodes of the transistor forming part of the pulse generator of Figure 1 as a function of time.

As explained hereinbefore, the pulse generator of Figure 1 is based on the bistable transistor circuit as illustrated in Figure 3 of the Eberhard patent referred to. Accordingly, a base resistor 15 is connected between base 14 and ground. A suitable source of potential such as battery 16 is serially connected with collector resistor 17 between ground and collector 13. Battery 16 may be bypassed by capacitor 18 for alternating-frequency currents. Battery 16 is poled to apply a voltage in the reverse direction between collector 13 and base 14. Thus, if body 11 is of the N type as will be assumed for further discussion, the collector 13 should be negative with respect to the base 14. If the body 11 should be of the P type, the polarity of the battery 16 must be reversed.

Another source of voltage such as battery 20 is serially connected with emitter resistor 21 between ground and emitter 12. Bypass capacitor 22 may be connected across battery 20. The battery 20 should also be poled to apply a voltage in the reverse direction between emitter 12 and base 14 to provide a monostable pulse generator. As will be explained hereinafter, if astable operation is desired, the battery 20 should be poled to apply a voltage in the forward direction between emitter 12 and base 14. This requires that the emitter 12 be positive with respect to the base 14 for an N type body 11. Again if the body should be of the P type, the polarity of the battery should be such that the emitter 12 is negative with respect to the base 14 to apply a voltage in the forward direction to the emitter.

The circuit of Figure 1 as described so far is a bistable circuit and may be triggered from one stable state of current conduction to the other by applying a positive trigger pulse such as shown at 23 to terminals 24 coupled between ground and emitter 12 through coupling capacitor 25. The operation of such a bistable circuit has been explained in the Eberhard patent referred to. In this connection, reference is also made to the paper by E. Eberhard, R. O. Endres and R. P. Moore entitled "Counter Circuits Using Transistors" which appears in the December, 1949 issue of "RCA Review" on pages 459–476. In his connection, reference is made particularly to Figures 2, 5, 6 and 7 and their discussion.

Briefly the operation of the bistable circuit as described so far may be explained by the fact that the current gain of transistor 10 when plotted against the emitter current has a peak corresponding to a large current gain and slopes on either side of the peak to a region of low current gain. On either slope of the current gain curve there is a point corresponding respectively to a high current conduction and a low current conduction equilibrium state (see Figure 2 of the "RCA Review" paper referred to). In the region between the two points of equilibrium state, the current gain is above unity. Outside of this region the current again decreases to values below unity. Consequently, the circuit will be unstable within this region of high current gain but will be stable on either side of the two points of equilibrium condition.

Figure 2:
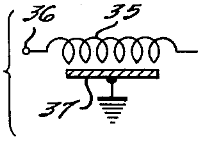
Figure 2 is a schematic representation of an open-circuited delay line which may be substitued for the delay line of the pulse generator of Figure 1.

In accordance with the present invention, a delay line 30 is provided which may, for example, be coupled to collector 13 by coupling capacitor 31, thereby to change the bistable circuit into a monostable or astable circuit. As illustrated in Figure 1, the delay line 30 is open-circuited at its far end. The delay line 30 may have any desired form and may, for example, consist of a transmission line provided the available space is sufficient to accommodate such a line, or it may be an artificial delay line consisting of sections as shown in Figure 1, each section including a series inductor 32 and a pair of shunt capacitors 33, 34. The delay line of Figure 1 consists of three individual sections and may, if desired, have a larger or smaller number of sections. However, it is also feasible to substitute the delay line of Figure 2 for the one shown in Figure 1. As illustrated in Figure 2, the delay line includes an inductor 35 having a terminal 36 and a metallic shield 37 which is grounded as shown. Thus, distributed capacitance is provided between inductor 35 and its shield 37. The terminal 36 may be connected to coupling capacitor 31 in Figure 1.

The operation of the pulse generator of Figure 1 may best be understood by reference to Figure 3 wherein $e_c$, $e_b$ and $e_e$ indicate respectively the collector, base and emitter voltage waves which are plotted as a function of time. Let it now be assumed that the pulse generator of Figure 1 is in its state of low current conduction which is its stable state of equilibrium. This state depends upon the current gain of the transistor 10, the resistance values of base resistor 15, collector resistor 17 and emitter resistor 21 and on the applied bias voltages. Corresponding to the low current conduction of the transistor, the collector voltage will have a comparatively high negative value as shown by curve portion 40, the base voltage will have a comparatively low negative voltage shown by curve portion 41 and the emitter voltage shown by curve portion 42 will also be negative but close to ground potential due to the low emitter and collector currents.

At the instant a positive trigger pulse 23 is applied to the emitter, a positive voltage peak 43 appears at the emitter. Consequently, due to the higher bias voltage between emitter 12 and base 14, the transistor will enter into a state of high current conduction. Accordingly, the collector voltage will become more positive due to the higher collector current as indicated by curve portion 44. The higher collector current flowing through base resistor 15 in turn will make the base voltage more negative as shown by curve portion 45. The emitter voltage follows to a certain extent the base voltage and also becomes more negative as shown by curve portion 46. However, the actual voltage difference between emitter 12 and base 14 will be positive corresponding to the state of high current conduction.

The positive wave front 44 which is developed at the collector 13 at the instant the transistor enters the state of high current conduction is now propagated along the delay line 30 and encounters the open-circuited far end of the line. The positive wave front is accordingly reflected back along the line 30 without change of polarity and reaches again the collector 13 at a time corresponding to twice the time delay of the delay line 30. This interval of time indicated at $t$ in Figure 3 equals $$2n\sqrt{LC}$$

wherein $n$ is the number of sections of delay line 30, L the inductance of inductor 32 and C the capacitance of either capacitor 33 or 34.

Consequently, the positive wave front 44 reappears again at the collector as shown by curve portion 47 with a time delay $t$. The voltage at the collector is now so low that a high current conduction can no longer be maintained and the transistor reverts back to its stable state of low current conduction. Accordingly, the base voltage becomes less negative as shown by curve portion 48 and the emitter voltage also becomes less negative as shown by curve portion 50. However, as clearly shown in Figure 3, the collector voltage does not immediately return to its original high negative value indicated at 40 but remains at a low negative value. The energy represented by wave front 44 which was originally introduced into the delay line 30 is not immediately dissipated because the line is not terminated at either end with its characteristic impedance. Accordingly, the voltage wave 47 continues to travel along the delay line 30 is again reflected at its open end and reappears at the collector as indicated by the voltage peaks 51, 52 and so on. Similar voltage peaks appear at the base as shown at 53 and 54. It will also be evident that successive voltage peaks are of lesser amplitude because a certain amount of energy is dissipated by the circuit resistance. However, it will also be noted that the emitter voltage wave 50 is substantially unaffected by the recurring collector voltage peaks 51 and 52.

The pulse generator of Figure 1 will remain in its equilibrium state of low current conduction because the effective emitter bias is in the reverse direction which prevents the circuit from going automatically into a state of high current conduction. However, upon the application of a succeeding positive trigger pulse 23 to the emitter, the same cycle of operation occurs again.

The emitter voltage wave $e_e$ may be obtained from output terminals 55, one of which is grounded, while the other one is coupled to emitter 12 through coupling capacitor 56. The base voltage wave $e_b$ may be obtained from output terminals 57, one of which is grounded, while the other is coupled to base 14 through coupling capacitor 58. The collector voltage wave $e_c$ may be obtained from output terminals 60, one of which is grounded, while the other is coupled to the collector 13 through coupling capacitor 61. It will, of course, be obvious that two output pulses are derived from the collector across collector resistor 17 in response to a trigger pulse. However, from both the base 14 and the collector 12 a single pulse is derived in response to a trigger pulse, the width of the output pulse being determined by the time delay of delay line 30.

It will be obvious that the circuit of Figure 1 may also be triggered by the application of a negative trigger pulse such as shown at 62 between base 14 and ground. The trigger pulses may be applied to input terminals 63, one of which is grounded, while the other is coupled to the base 14 through coupling capacitor 64. By applying a negative trigger pulse to the base, the effective voltage between emitter and base becomes more positive thereby to trigger the circuit into its state of high current conduction. Finally, a negative trigger pulse such as shown at 65 may be applied to the collector 13 through input terminals 66, one of which is grounded, while the other one is coupled to the collector 13 through coupling capacitor 67. However, it is to be understood that the negative trigger pulse 65 applied to the collector must have a higher amplitude than either a positive trigger pulse applied to the emitter or a negative trigger pulse applied to the base.

By way of example, the resistance of base resistor 15 of the pulse generator of Figure 1 may amount to 5,600 ohms and that of collector resistor 17 may be 18,000 ohms. The inductance of inductor 32 may be 159 microhenries and the capacitance of capacitors 33 or 34 may be 200 micro-microfarads. The time $t$ amounts to 16, 14, 12, 8, 3.5 and 1.5 microseconds with 39, 34, 30, 19, 10 and 4 sections respectively of the delay line 30.

As pointed out hereinbefore, the effective bias voltage applied to the emitter 12 may also be in the forward direction and, in that case, the pulse generator of Figure 1 will be astable, that is, a free-running oscillator will be obtained. In view of the comparatively large negative voltage developed across the base resistor 15, the emitter 12 should be made slightly less negative than the base 14 to provide a bias voltage in the forward direction.

The operation of the astable pulse generator of Figure 1 may again be explained by reference to Figure 3. Let it be assumed that a voltage transient causes the circuit to change from a state of low current conduction to a state of high current conduction. The operation of the circuit the same as that previously explained and the original collector voltage wave 44 reappears as wave 47 a time $t$ later and again causes the circuit to revert to its state of low current conduction. The collector voltage becomes more and more negative due to the dissipation of energy in the delay line 30 so that the transistor eventually will automatically revert to a state of high current conduction, because the emitter is biased in the forward direction.

The width of the output pulses corresponding to a change from low to high current conduction is again determined by the time delay of the delay line. The pulse obtained when the circuit changes from high to low current conduction depends essentially on the rate of dissipation of the energy in the delay line 30 and the circuit resistance associated therewith. The time constant of any resistance and capacitance such as resistor 17 and capacitor 31 connected to the collector 13 should be large compared to the rate of dissipation of the energy. In other words, the time constant of the resistance and capacitance connected to the collector should be large compared to the pulse repetition rate.

Figure 4:
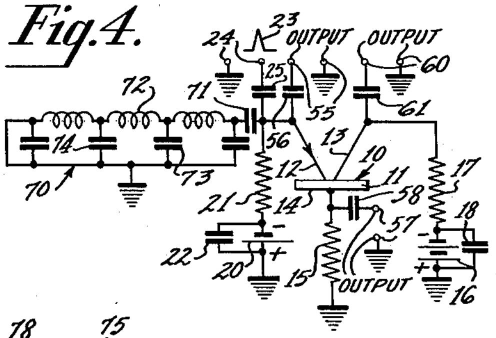
Figure 4 is a schematic circuit diagram of a modified monostable pulse generator embodying the present invention.
Figure 5:
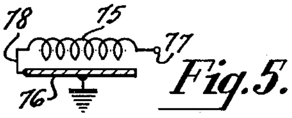
Figure 5 is a schematic representation of a short-circuited delay line which may be substiuted for the delay line of the pulse generator of Figure 4.

Another monostable pulse generator in accordance with the present invention is shown in Figure 4. The generator of Figure 4 is again based on the bistable circuit of the Eberhard patent. However, as illustrated in Figure 4, a delay line 70 short-circuited at its far end is coupled through coupling capacitor 71 between emitter 12 and ground. Otherwise, the circuit of Figure 4 is similar to that of Figure 1. The delay line 70 may again consist of several sections, each including a series inductor 72 and shunt capacitors 73, 74 which provide lumped inductance and capacitance. Alternatively, it is again feasible to substitute for the delay line 70 a transmission line having distributed capacitance and inductance. Another form of delay line which may be substituted for delay line 70 is shown in Figure 5. The delay line of Figure 5 includes an inductor 75 provided with a metallic shield 76 which is grounded. One terminal 77 of the delay line may be coupled to capacitor 71 in Figure 4. The opposite end or terminal of inductor 75 may be connected to the grounded shield 76 through lead 78.

Figure 6:
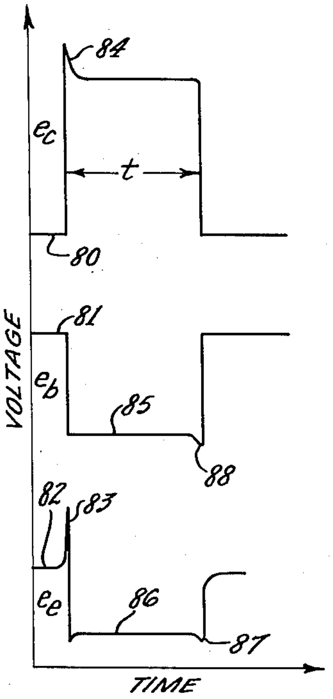
Figure 6 is a graph showing the voltages at the three electrodes of the transistor forming part of the pulse generator of Figure 4 as a function of time.

The operation of the pulse generator of Figure 4 will be explained by means of Figure 6 wherein $e_c$, $e_b$ and $e_e$ indicate again respectively the collector, base and emitter voltages which have been plotted as a function of time. The monostable pulse generator of Figure 4 is preferably triggered by the application of a positive trigger pulse 23 to input terminals 24 coupled between ground and emitter 12.

Let it be assumed that the pulse generator of Figure 4 is in its low current conduction state or in its state of stable equilibrium. Accordingly, the collector voltage is highly negative as shown by curve portion 80, the base voltage approaches ground as shown by curve portion 81, while the emitter voltage also has a small negative value as shown by curve portion 82. The bias voltage applied by battery 20 to emitter 12 is in the reverse direction. The application of the positive trigger pulse 23 to the emitter causes the emitter voltage to rise momentarily in a positive direction as shown at 83. Consequently, due to the higher positive bias between emitter and base, the transistor will immediately go into a state of high current conduction so that the collector voltage becomes less negative as shown at 84. Due to the larger collector current flowing through base resistor 15, the base voltage becomes more negative as shown at 85. The emitter voltage again follows to a certain extent the base voltage as shown by curve portion 86 so as to maintain a positive emitter bias with respect to the base.

The positive trigger pulse indicated by the emitter voltage peak 83 is propagated down the delay line 70. As the positive pulse encounters the short-circuited end of the line, it is inverted and returns to the emitter as a negative pulse after a time $t$ which is twice the delay time of line 70. This negative pulse shown at 87 reduces the emitter voltage. Simultaneously a smaller change of the base voltage shown at 88 takes place in a negative direction. The effective voltage between emitter and base is accordingly reduced again so that the pulse generator returns to its stable state of low current conduction. The collector voltage and the base voltage return almost instantaneously to their former values corresponding to the low current conduction state.

By way of example, the resistance of base resistor 15 of the pulse generator of Figure 4 may amount to 10,000 ohms and that of collector resistor 5,600 ohms. Using the same circuit constants of delay line 70 as of delay line 30, the pulse width or time *t* was 15, 7, 3 and 1.5 microseconds with 38, 19, 9 and 5 sections respectively of the delay line 70.

The pulses or wave shapes developed at the collector, base and emitter may be derived respectively from output terminals 60, 57 and 55, that is, across collector resistor 17, base resistor 15 or emitter resistor 21 respectively. It will be noted that the pulse shapes are much cleaner compared to those illustrated in Figure 3. However, the collector voltage still exhibits a sharp peak 84 which may not be desired.

Figure 7:
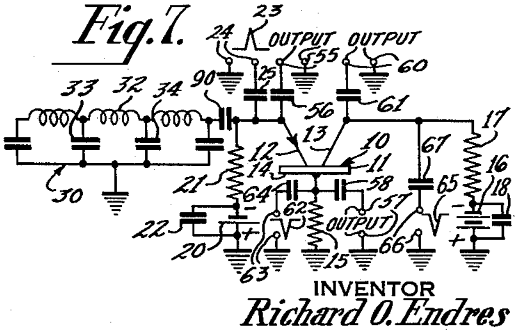
Figure 7 is a schematic circuit diagram of another monostable pulse generator in accordance with the invention.

A further modification of the pulse generator of the invention is illustrated in Figure 7. This pulse generator will develop still sharper square-topped pulses where the voltage peaks 84 and 83 of the collector and emitter voltage respectively are absent.

The pulse generator of Figure 7 is provided with an open-circuited delay line 30 which is coupled through coupling capacitor 90 between emitter 12 and ground. The delay line 30 may be identical to that shown in Figure 1 or the delay line of Figure 2 may be substituted, therefor. The pulse generator of Figure 7 may be triggered by the application of a positive trigger pulse 23 to emitter 12, a negative trigger pulse 62 to base 14 or a negative trigger pulse 65 to collector 13.

The operation of the pulse generator of Figure 7 will be explained by reference to Figure 6. By means of battery 20, an effective bias in the reverse direction is again applied to the emitter 12. Consequently, the pulse generator has a stable state of equilibrium having low current conduction. By applying a negative trigger pulse to the base, for example, the circuit immediately goes into a state of high current conduction in the manner previously explained. The same result will be obtained by applying a positive trigger pulse to the emitter or a negative trigger pulse of higher amplitude to the collector. However, as explained hereinbefore, the collector voltage peak 84 and the emitter voltage peak 83 will be absent only if the trigger pulses are impressed on the base.

As the pulse generator of Figure 7 goes from low to high current conduction, a negative wave front is developed at the emitter because the positive voltage peak 83 is absent. This negative wave front or pulse is propagated down delay line 30 and is reflected by the open-circuited far end without change of polarity. Accordingly, after a time *t* the negative pulse will again reappear at the emitter 12 to trigger the circuit into its state of low current conduction in the manner previously explained. Hence, except for the missing voltage peaks 84 and 83, the wave forms of the pulse generator of Figure 7 will be those illustrated in Figure 6.

These waves may again be obtained from output terminals 55, 57 and 60 as explained hereinabove.

When negative trigger pulses 62 are applied to base 14, the impedance of the trigger pulse generator coupled to the input terminals 63 should be high compared to the resistance of base resistor 15. This may be important because the resistance of base resistor 15 may be critical for best results and the source impedance should, therefore, be high so as not to short circuit resistor 15. Furthermore, as already explained, the time constant of the resistance and capacitance connected to collector 13 should be long compared to the pulse repetition rate. In order to obtain such a long time constant, it may be desirable to provide a resistor between coupling capacitor 67 and collector 13 in case the generator is triggered by the application of negative pulses 65 to the collector. The wave shape of the pulses developed across collector resistor 17 is more nearly square-topped than those of the generator of Figures 1 and 4.

There have thus been disclosed pulse generators including a current multiplication transistor connected to provide a bistable circuit, and a delay line. In this manner, either a monostable or an astable pulse generator may be obtained. The delay line may either be open-circuited or short-circuited at its far end and may be connected either to the emitter or to the collector. The pulse generator of the present invention is characterized by its great simplicity, its flexibility and its low power consumption. The pulse width is readily determined by the time delay of the delay line.

What is claimed is:

1. An astable pulse generator comprising a single transistor including a semi-conducting body, a base electrode, an emitter electrode and a collector electrode in contact with said body, said transistor being characterized by short-circuit collector current increments which are larger than corresponding emitter current increments within a predetermined range of operating potentials, meeans establishing said range of operating potentials including a first and a second source of voltage, said first source of voltage and a first resistor being connected serially between a common junction point and said collector electrode, said second source of voltage and a second resistor being connected serially between said junction point and said emitter electrode, a third resistor connected between said junction point and said base electrode, said first source of voltage being poled to apply a voltage in the reverse direction between said collector and base electrodes, said second source of voltage being poled to apply a voltage in the forward direction between said emitter and base electrodes, an open-circuited delay line coupled between said collector electrode and said junction point for propagating voltage waves corresponding to voltage variations on said collector electrode to the end of said delay line and for reflecting and applying said voltage waves to said collector electrode to vary the current conducting condition of said transistor, and means for deriving output pulses across one of said resistors at a repetition rate determined by said delay line.

2. A monostable pulse generator comprising a single transistor including a semi-conducting body, a base electrode, an emitter electrode and a collector electrode in contact with said body, said transistor being characterized by short-circuit collector current increments which are larger than corresponding emitter current increments within a predetermined range of operating potentials, means establishing said range of operating potentials including a first and a second source of voltage, said first source of voltage and a first resistor being connected serially between a common junction point and said collector electrode, said second source of voltage and a second resistor being connected serially between said junction point and said emitter electrode, a third resistor connected between said junction point and said base electrode, said sources of voltage being poled to apply a voltage in the reverse direction between said collector and base electrodes and between said emitter and base electrodes, a short-circuited delay line coupled between said emitter electrode and said junction point for propagating voltage waves corresponding to voltage variations on said emitter electrode to the end of said delay line and for reflecting and applying said voltage waves to said emitter electrode to vary the current conducting condition of said transistor, means for applying positive trigger pulses between said emitter electrode and said junction point, and means for deriving output pulses across one of said resistors at a repetition rate determined by the time delay of said delay line.

3. A pulse generator comprising a transistor including a semi-conducting body, a base electrode, an emitter electrode and a collector electrode in contact with said body, said transistor being characterized by short-circuit collector current increments which are larger than corresponding emitter current increments within a predetermined range of operating potentials, means establishing said range of operating potentials including a first and a second source of voltage, said first source of voltage and a first resistor being connected serially between a common junction point and said collector electrode, said second source of voltage and a second resistor being connected serially between said junction point and said emitter electrode, a third resistor connected between said junction point and said base electrode, said sources of voltage being poled to apply a voltage in the reverse direction between said collector and base electrodes and between said emitter and base electrodes, an open-circuited delay line coupled between said emitter electrode and said junction point, means for applying trigger pulses between one of said electrodes and said junction point, and means for deriving output pulses across one of said resistors at a repetition rate determined by the time delay of said delay line.

4. A pulse generator as defined in claim 3 wherein positive trigger pulses are applied between said emitter electrode and said junction point.

5. A pulse generator as defined in claim 3 wherein negative trigger pulses are applied between said base electrode and said junction point.

6. A pulse generator as defined in claim 3 wherein negative trigger pulses are applied between said collector electrode and said junction point.

7. A triggered monostable pulse generator comprising a current-multiplication transistor including a semiconducting body, a base electrode in low-resistance contact with said body, an emitter electrode and a collector electrode in rectifier contact with said body, means connected between a common junction point and said rectifier electrodes for applying a voltage in the reverse direction between each of said rectifier electrodes and said base electrode, resistors connected individually between each of said electrodes and said junction point, an open-circuited delay line coupled between said emitter electrode and said junction point, means applying trigger pulses between one of said electrodes and said junction point, and means for deriving output pulses across one of said resistors.

8. A pulse generator comprising a single transistor including a semi-conducting body, a base electrode, an emitter electrode, and a collector electrode in contact with said body, said transistor being characterized by short-circuit collector current increments which are larger than corresponding emitter current increments within a predetermined range of operating potentials, means establishing said range of operating potentials including an energy source for applying operating potentials to said electrodes, a delay line coupled between one of said emitter and collector electrodes and a common junction point of said generator for propagating voltage waves corresponding to voltage variations on one of said emitter and collector electrodes to the end of said delay line and for reflecting and applying said voltage waves to the electrode with which said delay line is coupled for varying the current conducting condition of said transistor, and means for deriving an output wave between one of said electrodes and said common junction point.

9. A pulse generator comprising a single transistor including a semi-conducting body, a base electrode, an emitter electrode, and a collector electrode in contact with said body, said transistor being characterized by short-circuit collector current increments which are larger than corresponding emitter current increments within a predetermined range of operating potentials, means establishing said range of operating potentials including an energy source for applying operating potentials to said electrodes and resistors connected individually between a common junction point of said generator and each of said electrodes, a delay line coupled between one of said collector and emitter electrodes and said junction point for propagating voltage waves corresponding to voltage variations on one of said collector and emitter electrodes to the end of said delay line and for reflecting and applying said voltage waves to the electrode with which said delay line is coupled for varying the current conducting condition of said transistor, and means for deriving an output wave across one of said resistors.

10. A monostable pulse generator comprising a single current-multiplication transistor including a semi-conducting body, a base electrode, an emitter electrode, and a collector electrode in contact with said body, means connected between a common junction point and said emitter and collector electrodes for applying a voltage in the reverse direction between each of said emitter and collector electrodes and said base electrode, impedance elements connected individually between each of said electrodes and said junction point, a delay line coupled between one of said collector and emitter electrodes and said junction point for propagating voltage waves corresponding to voltage variations on one of said emitter and collector electrodes to the end of said delay line and for reflecting and applying said voltage waves to the electrode to which said delay line is coupled for varying the current conducting condition of said transistor, means for applying trigger pulses between one of said electrodes and said junction point, and means for deriving output pulses across one of said impedance elements.

11. A triggered monostable pulse generator comprising a single current-multiplication transistor including a semi-conducting body, a base electrode in low-resistance contact with said body, an emitter electrode and a collector electrode in rectifier contact with said body, means connected between a common junction point and said rectifier electrodes for applying a voltage in the reverse direction between each of said rectifier electrodes and said base electrode, resistors connected individually between each of said electrodes and said junction point, a delay line coupled between one of said rectifier electrodes and said junction point for propagating voltage waves corresponding to voltage variations on said one of said rectifier electrodes to the end of said delay line and for reflecting and applying said voltage waves to said one of said rectifier electrodes to vary the current conducting condition of said transistor, means applying trigger pulses between one of said electrodes and said junction point, and means for deriving output pulses across one of said resistors.

12. A pulse generator as defined in claim 11 wherein said delay line is open-circuited and is connected to said collector electrode.

13. A pulse generator as defined in claim 11 wherein said delay line is short-circuited and is connected to said emitter electrode.

14. A monostable pulse generator comprising a single transistor including a semi-conducting body, a base electrode, an emitter electrode, and a collector electrode in contact with said body, said transistor being characterized by short-circuit collector current increments which are larger than corresponding emitter current increments within a predetermined range of operating potentials, means establishing said range of operating potentials including a first and a second source of voltage, said first source of voltage and a first resistor being connected serially between a common junction point and said collector electrode, said second source of voltage and a second resistor being connected serially between said junction point and said emitter electrode, a third resistor connected between said junction point and said base electrode, said sources of voltage being poled to apply a voltage in the reverse direction between said collector and base electrodes and between said emitter and base electrodes, an open-circuited delay line coupled between said collector electrode and said junction point for propagating voltage waves corresponding to voltage variations on said collector electrode to the end of said delay line and for reflecting and applying said voltage waves to said collector electrode to vary the current conducting condition of said transistor, means for applying trigger pulses between one of said electrodes and said junction point, and means for deriving output pulses across one of said resistors at a repetition rate determined by the time delay of said delay line.

15. A pulse generator as defined in claim 14 wherein positive trigger pulses are applied between said emitter electrode and said junction point.

16. A pulse generator as defined in claim 14 wherein negative trigger pulses are applied between said base electrode and said junction point.

17. A pulse generator as defined in claim 14 wherein negative trigger pulses are applied between said collector electrode and said junction point.

References Cited in the file of this patent

UNITED STATES PATENTS

| | | |
|---|---|---|
| 2,417,834 | Lord | Mar. 25, 1937 |
| 2,445,448 | Miller | July 20, 1948 |
| 2,533,001 | Eberhard | Dec. 5, 1950 |
| 2,556,296 | Rack | June 12, 1951 |
| 2,681,996 | Wallace | June 22, 1954 |